Patented June 10, 1952

2,600,080

UNITED STATES PATENT OFFICE 2,600,080

4-ACETYLAMINO-N-n-BUTYL-1,8-NAPHTHALIMIDE

Marvin O. Shrader, Westfield, N. J., assignor to General Aniline & Film Corporation, New York, N. Y., a corporation of Delaware No Drawing. Application December 5, 1946, Serial No. 714,149

1 Claim. (Cl. 260—281)

The present invention relates to 4-acylamino-1.8-naphthalimides and to a method of preparing the same.

The art is cognizant of the fact that compounds of the 1.8-naphthalimide type and especially those in which the 4-position is substituted by an amino group are generally of a greenish yellow color. Certain of these compounds are found to be of technical interest as dyes which are capable of dyeing fibers such as wool and acetate silk in yellow shades. These dyeings are characterized by the fact that they show beautiful greenish yellow fluorescence in ultra-violet light.

I have now found that the 4-acylamino-1.8-naphthalimides are of even greater value than the 4-amino compounds primarily because of their ability to yield dyeings which show a bluish fluorescence in ultra-violet light. Because of this rather unique property, these compounds are of marked importance for dyeing lacquers, resins, solvents and the like.

It is accordingly an object of the present invention to provide a new class of 1.8-naphthalimides capable of yielding dyeings which show a bluish fluorescence in ultra-violet light.

It is a further object of the present invention to provide 4-acylamino-1.8-naphalimides which have the property of showing bluish fluorescence in ultra-violet light.

A further object of the present invention is to provide 4-acylamino-1.8-naphthalimides having particular utility in the dyeing of lacquers, resins and solvents.

A further object involves the method of preparing such 4-acylamino-1.8-naphthalimides.

Other than further important objects of the invention will become apparent as the description proceeds.

The 4-acylamino-1.8-naphthalimides contemplated by the present invention are typified by the following structural formula:

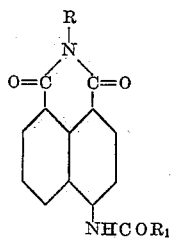

in which R is hydrogen, an aliphatic radical such as alkyl, i. e. methyl, ethyl, propyl, butyl, isobutyl, amyl, hexyl, octyl, isooctyl, decyl, dodecyl, tetradecyl, octadecyl and the like; hydroxy alkyl such as hydroxy methyl, hydroxy propyl and the like; carboxy alkyl such as carboxy methyl, carboxy ethyl and the like; cyclo alkyl such as cyclopentyl, cyclohexyl and the like; aralkyl such as benzyl, menaphthyl and the like; or an aromatic radical such as aryl, i. e. phenyl, toluyl, napthyl, anthracyl and the like; carboxy aryl, i. e. carboxy phenyl, carboxy naphthyl and the like; alkoxy aryl such as anisyl, hydroxy aryl such as salicyl and $R_1$ is hydrogen, amino, an aliphatic radical such as alkyl as above, hydroxy alkyl such as hydroxy methyl, hydroxy isobutyl and the like; aminoalkyl such as amino methyl, amino ethyl, and the like; alkoxy alkyl such as methoxy methyl, ethoxy methyl and the like; aryloxy alkyl such as phenoxy methyl and the like; cycloalkyl such as cyclohexyl and the like, aryl such as phenyl, toluyl, naphthyl and the like, hydroxy aryl such as salicyl and the like, amino aryl such as as o-, m-, p-amino phenyl and the like; alkoxy aryl such as o-, m-, p-methoxy phenyl and the like.

The compounds of the aforementioned classification are obtained by condensing 4-nitro naphthalic anhydride with ammonia or the desired amine in the presence of an organic solvent, reducing the nitro group by means of a metal capable of yielding hydrogen ions in acidic medium such as iron, zinc, tin and the like, and amidating the thus formed amino group by heating the 4-amino-1.8-napthalimide with the anhydride or acyl chloride of the desired acid. The end products are readily isolated from the reaction mixture by cooling and filtering the same.

As is implied from the formula given above, the amines which are condensed with the 4-nitro napthalic anhydride may be aliphatic or aromatic in character. Suitable aliphatic amines are methylamine, ethylamine, propylamine, butylamine, isobutylamine, amylamine, octylamine, iso-octylamine, decylamine, tetra-decylamine, octadecylamine and the like; monomethylolamine, mono-propanolamine and the like; amino acetic acid, amino propionic acid, cyclopentylamine, cyclohexylamine, benzylamine, menaphthylamine, and the like. As examples of suitable arylamines reference may be made to aniline, toluylamine, naphthylamine, aminobenzoic acid, anthranilic acid, anisidine, salicylamine and the like. It is evident that in addition to ammonia, any aliphatic or aromatic primary amine may be utilized to form the imide grouping.

Similarly, the acids, the anhydrides or acid chlorides of which are employed to amidate the amino group in 4-position may be aliphatic such as formic acid, carbamic acid, acetic acid, propionic acid, butyric acid, glycocollic acid, amino acetic acid, methoxy acetic acid, phenoxy acetic acid, hexahydrobenzoic acid, or aromatic such as benzoic acid, naphthoic acid, salicylic acid, o-, m-, p-aminobenzoic acid, o-, m-, p-methoxybenzoic acid and the like.

The organic solvents which are employed are normally liquid substances which are inert to the reactants. Suitable solvents are acetic acid, benzene, toluene, kerosene and the like.

The reaction between the naphthalic anhydride and the amine is effected by heating the reactants preferably to refluxing. However, lower temperatures may be employed, although when used, the duration of the reaction is increased. The reduction step is generally effected at a temperature ranging from about 80 to 100° C. although here too it is preferable to heat the reactants to refluxing.

If the amidation reaction is carried out while using an acyl chloride then it is recommended that there be present a binding agent for the acid liberated during this step. For this purpose, one may employ any of the usual acid binding agents such as pyridine, quinoline and the like.

Examples of compounds which are illustrative of the invention are the following:

1. 4-formylamino-1.8-naphthalimide
2. 4-acetylamino-1.8-naphthalimide
3. 4-benzoylamino-1.8-naphthalimide
4. 4-acetylamino-N-n-butyl-1.8-naphthalimide
5. 4-acetylamino-N-n-octyl-1.8-naphthalimide
6. 4-acetylamino-N-n-tetradecyl-1.8-naphthalimide
7. 4-acetylamino-N-n-octadecyl-1.8-naphthalimide
8. 4-benzoylamino-N-n-butyl-1.8-naphthalimide
9. 4-benzoylamino-N-n-tetradecyl-1.8-naphthalimide
10. 4-acetylamino-N-isobutyl-1.8-naphthalimide
11. 4-salicylamino-N-methyl-1.8-naphthalimide
12. 4-phenylacetylamino-N-propyl-1.8-naphthalimide
13. 4-acetylamino-N-cyclohexyl-1.8-naphthalimide
14. 4-benzoylamino-N-benzyl-1.8-naphthalimide
15. 4-N-(amino-acetyl)-amino-N-methyl-1.8-naphthalimide
16. 4-acetylamino-N-phenyl-1.8-naphthalimide
17. 4-propionylamino-N-(p-methoxy)-phenyl-1.8-naphthalimide
18. 4-benzoylamino-N-monoethanol-1.8-naphthalimide
19. 4-acetylamino-N-carboxymethyl-1.8-naphthalimide
20. 4-acetylamino-N-(p-carboxy)-phenyl-1.8-naphthalimide
21. 4-acetylamino-N-salicyl-1.8-naphthalimide
22. 4-carbamylamino-N-propyl-1.8-naphthalimide
23. 4-glycocollyl-amino-N-n-butyl-1.8-naphthalimide
24. 4-methoxyacetylamino-N-methyl-1,8-naphthalimide
25. 4-phenoxyacetylamino-N-n-butyl-1.8-naphthalimide
26. 4-hexahydrobenzoylamino-N-ethyl-1.8-naphthalimide
27. 4-(p-amino) - benzoylamino - N - isobutyl-1.8-naphthalimide
28. 4-(o-methoxy) - benzoylamino - N - hexyl-1.8-naphthalimide The 4-acylamino-1.8-naphthalimides of the present invention are readily soluble in organic solvents particularly lacquer solvents such as benzene, toluene; chlorhydrocarbons such as chloroform, ethylene dichloride and the like; ketones such as acetone, methyl, ethyl ketone and the like; ethers such as methylether, ethylether and the like; esters such as butyl acetate and the like; or mixtures of such solvents. When so dissolved, the products impart a beautiful bluish fluorescence to the composition when viewed in ultra-violet light. In this respect, they are in marked contrast to the known 4-amino-1.8-naphthalimides which impart a greenish yellow fluorescence when viewed in ultra-violet light.

The following examples illustrate the invention but it is to be understood that the examples are illustrative and not limitative. The parts unless otherwise specified are by weight.

*Example 1*

A mixture of 50 parts of 4-nitro-naphthalic anhydride, 50 parts of n-butylamine and 300 parts of acetic acid is refluxed until all of the solid material is dissolved. The solution is then cooled to 100° C. and over a period of 1 hour to 2 hours, 25 parts of finely powdered iron is added to reduce the nitro group to an amino group. One hour after the iron has been added, 100 parts of acetic anhydride is incorporated in the mixture and the mixture is refluxed until the reaction is completed. The mixture is then cooled, filtered, washed with acetic acid and sludged in water to yield a product which is almost white in color and which after recrystallization from glacial acetic acid melts at 231–232° C. When this product is dissolved or dispersed in an organic material such as benzene or a solution of a lacquer, it imparts a beautiful bluish fluorescence thereto.

*Example 2*

The procedure is the same as in Example 1 excepting that 50 parts of octylamine are utilized in lieu of n-butylamine. The product which is obtained after recrystallization from glacial acetic acid melts at 186–187° C. and is more soluble in organic solvents than that obtained in Example 1. The color and depth of the bluish fluorescence imparted by the product to organic materials are practically identical with those obtained with the product of Example 1.

*Example 3*

The procedure is the same as in Example 1 excepting that 50 parts of n-tetradecylamine is used in lieu of n-butylamine. The product obtained resembles that of Example 2. After recrystallization from glacial acetic acid, it melts at 165–166° C.

*Example 4*

The procedure is the same as in Example 1 excepting that there are employed 100 parts of n-octadecylamine in lieu of n-butylamine. The product which is obtained after recrystallization from glacial acetic acid melts at 154–156° C. The product is quite similar to that of Example 3.

*Example 5*

2 parts of 4-amino-N-n-butyl-1.8-naphthalimide (obtained as in Example 1 by condensing n-butylamine with 4-nitro-1.8-naphthalic anhydride and reducing the nitro group) 20 parts of benzene, 3 parts of benzoyl chloride and a trace of pyridine are refluxed until benzoylation of the amino group in 4-position is complete. The reaction mixture is then cooled, filtered and washed with benzene. The resulting product when recrystallized from acetic acid melts at 226° C. This product imparts a much bluer fluorescence to organic solvents than the products of the previous examples.

*Example 6*

The procedure is the same as in Example 5 excepting that 2 parts of 4-amino-N-n-tetradecyl-1.8-naphthalimide is used for the benzoylation reaction. The product obtained is much more soluble in organic solvents than that of Example 5 although it has similar fluorescent properties.

*Example 7*

The procedure is the same as in Example 5 excepting that there is used for the benzoylation reaction, 3 parts of hexahydrobenzoic acid.

*Example 8*

The procedure is the same as in Example 1 excepting that there is used 50 parts of benzylamine in lieu of n-butylamine.

Various modifications of the invention will occur to persons skilled in the art and they therefore do not intend to be limited in the patent granted except as necessitated by the prior art and the appended claim.

I claim:

The compound of the following formula:

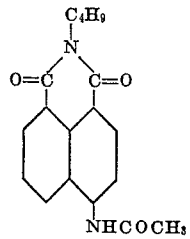

said compound being capable of imparting a bluish fluorescence when dissolved in an organic medium.

MARVIN O. SHRADER.

REFERENCES CITED

The following references are of record in the file of this patent:

UNITED STATES PATENTS

| Number | Name | Date |
| --- | --- | --- |
| 1,796,011 | Eckert | Mar. 10, 1931 |
| 1,796,012 | Eckert | Mar. 10, 1931 |
| 1,836,529 | Eckert | Dec. 15, 1931 |
| 2,385,106 | Scalera | Sept. 18, 1945 |
| 2,415,373 | Scalera | Feb. 4, 1947 |

OTHER REFERENCES

Barnett: "Anthracene and Anthraquinone" (D. Van Nostrand; New York; 1921); pages 8 and 9.

Francis et al.: J. Chem. Soc. (London), 1935, pp. 496–499.